Figure 6:
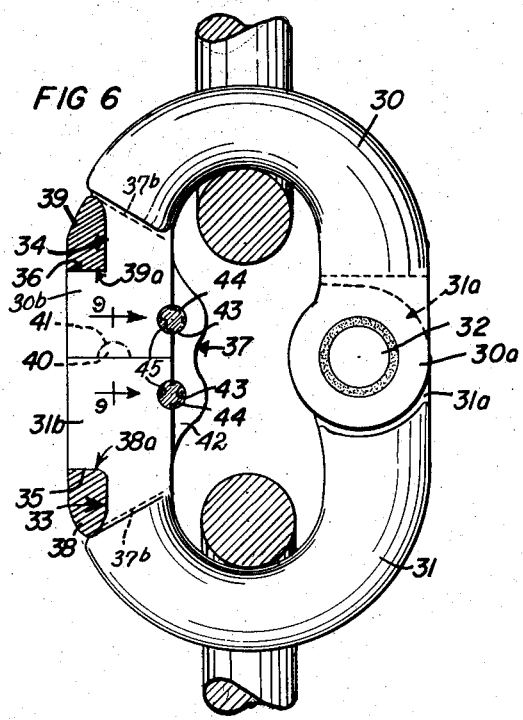

July 2, 1963 W. C. WALLER 3,095,691
CHAIN LINKS OR THE LIKE
Filed Oct. 3, 1958 2 Sheets-Sheet 1
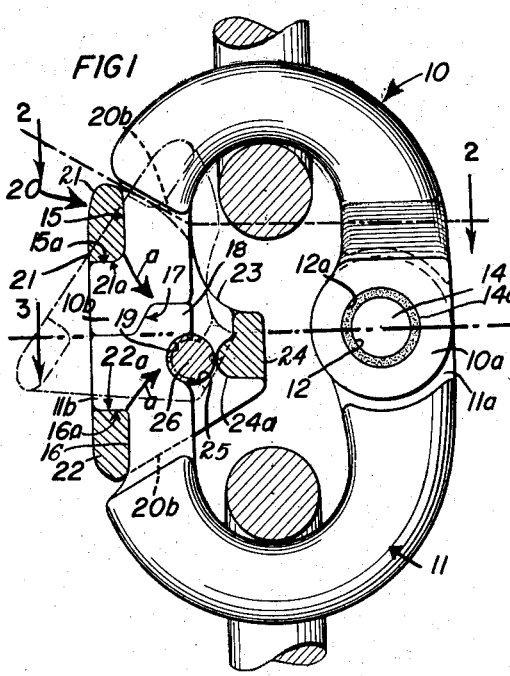
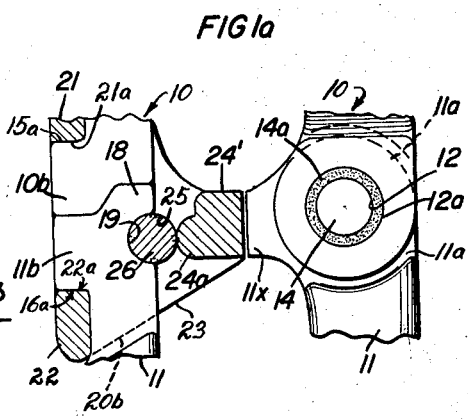
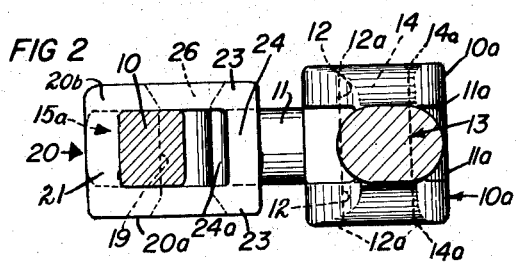
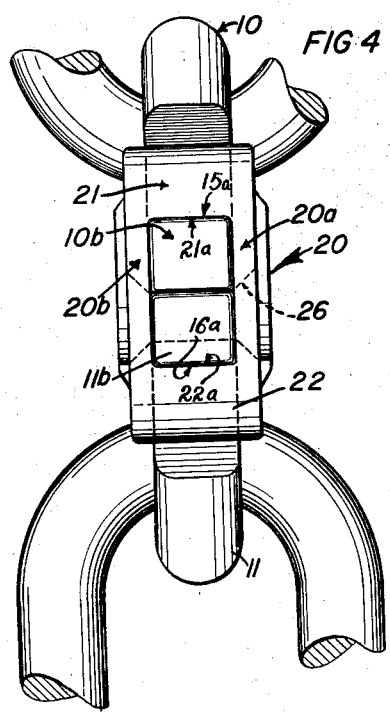
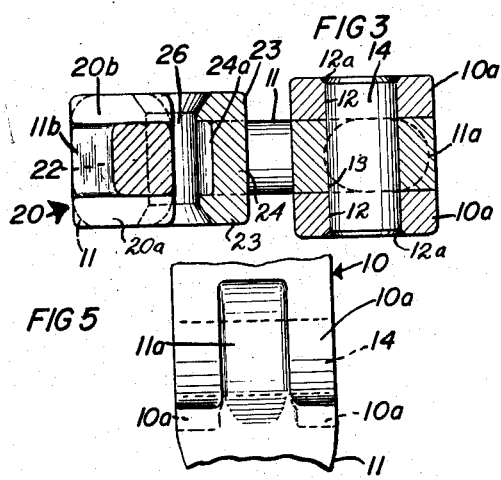
INVENTOR.
William C. Waller
BY Eugene E. Stevens and Eugene E. Stevens III
HIS ATTORNEYS July 2, 1963 W. C. WALLER 3,095,691
CHAIN LINKS OR THE LIKE
Filed Oct. 3, 1958 2 Sheets-Sheet 2

INVENTOR.
William C. Waller
BY Eugene E. Stevens
and Eugene E. Stevens III
HIS ATTORNEYS.

United States Patent Office 3,095,691
Patented July 2, 1963

3,095,691
CHAIN LINKS OR THE LIKE
William C. Waller, 4142 Madelia Ave., Sherman Oaks, Calif.
Filed Oct. 3, 1958, Ser. No. 765,159
7 Claims. (Cl. 59—88)

My invention relates to connecting or repair links for chains, wire cables and the like.

Briefly and generally stated, the invention has for one of its important objects to provide a link as characterized which will equal in strength a solid or welded link made from heat treated alloy steel, and which, although of general utility, is especially suitable for either field or factory assembly as a jointer link in slings and other wire rope and chain-incorporating apparatus.

A further object is to provide a link for the purposes indicated which provides novel and improved means for preventing eccentric bending of the same under longitudinal loads and particularly at the site of the load-sustaining shoulders of stud heads.

Additionally, the invention contemplates in a link of this class, a novel shackle-form connector for the opposed stud headed ends of one of its limbs.

The invention also aims to provide a link, as characterized, which is simple in construction, strong and durable, and which need not be made oversized with respect to parts to be connected, the nature of its construction being such that it can be readily and quickly applied for use without necessitating expensive and time consuming welding operations or the exercise of unusual mechanical skill.

Other objects and advantages of the invention will be readily apparent to those versed in the art from a reading of the detailed description of the embodiments which are disclosed in the accompanying drawings. It is to be understood, however, that the invention is susceptible of other mechanical expressions within the spirit and scope of the subject matter claimed hereinafter.

In the drawings, wherein the same reference characters have been used to designate the same parts throughout the several views—

Figure 7:
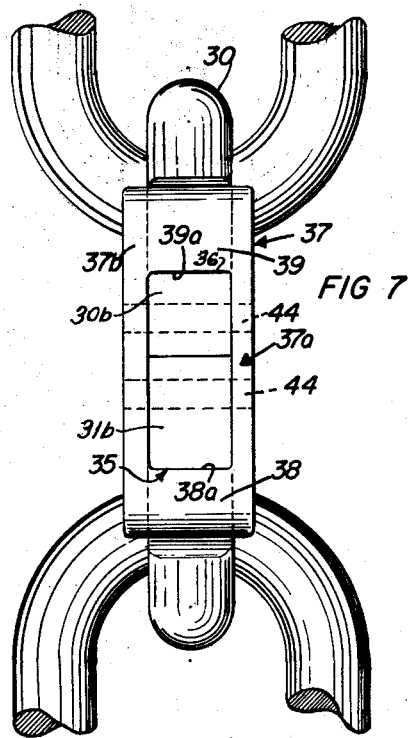
Figure 8:
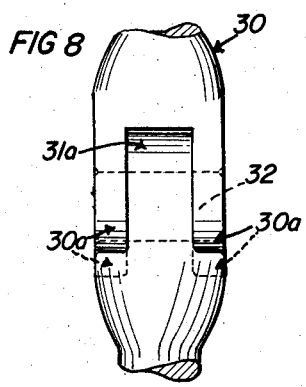
Figure 10:
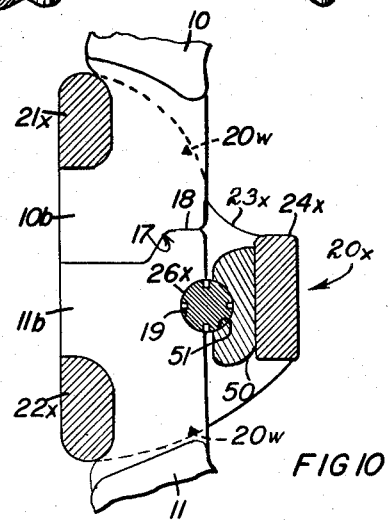
Figure 9:
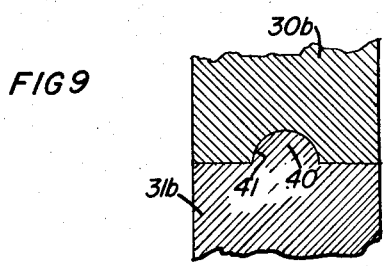

FIG. 1 is an elevational view, partly in section, of a link embodying my invention; FIG. 1A is a fragmentary view similar to FIG. 1 but showing a slight modification thereof; FIG. 2 is a cross sectional view taken on the line 2—2 of FIG. 1; FIG. 3 is a cross sectional view on the line 3—3 of FIG. 1; FIG. 4 is an elevational view of one side and showing the socket-providing coupling member in edge elevation; FIG. 5 is a fragmentary edge elevation of the opposite side of the link to that shown in FIG. 3; FIG. 6 is an elevation of a modified link; FIG. 7 is a side elevation thereof; FIG. 8 is a fragmentary elevation of the link side opposite to that shown in FIG. 7; FIG. 9 is a detail section taken on line 9—9 of FIG. 6; and FIG. 10 is fragmentary sectional elevation showing a slight modification in the FIG. 1 structure.

Referring to the drawings by reference characters, the link comprises the U-form sections 10, 11. One leg of the section 10 terminates in the laterally spaced and opposed ears 10a, between which the tongue extension 11a of the corresponding leg of section 11 is transversely pivoted on pin 14. The pin 14 extends through aligned holes 12, 13, in the respective ear and tongue portions 10a, 11a, the outer ends of the ear holes 12 being outwardly beveled as at 12a so that pin 14 can be welded in place, as indicated at 14a, prior to subjection of the assembled link sections 10, 11 to heat treatment.

FIG. 1 illustrates the other limbs of link sections 10, 11 as providing the terminal studs 10b, 11b, respectively having outwardly directed lug portions, said studs being arranged in abutting end to end relationship. These studs 10b, 11b are formed by cutouts 15, 16, respectively, in the outer limb edges of the sections 10, 11 inwardly of the adjacent ends thereof, said cutouts providing the stud lugs with the transverse load-supporting shoulders 15a, 16a, as indicated.

FIG. 1 also indicates the stud 11b of the link section 11 as providing the transversely rounded link section limb extension lug or tongue 18 which is received in a correspondingly formed recess 17 which is formed in the opposed stud (10b) provided end of the corresponding limb of link section 10.

Also to be noted is the fact that the rear edge of the stud 11b has the rounded seat 19, the purpose of which will be presently explained.

In carrying out the invention the abutting stud-provided ends 10b, 11b of the last mentioned link section limbs are received in a socket member which is generally designated by reference character 20.

The stud-receiving socket member 20 has a lateral or front entry provides the spaced and parallel side walls 20a, 20b which are connected adjacent each end by a back wall which comprises bridge members 21, 22. The opposed edges of bridge members 21, 22 provide the transverse load-supporting shoulders 21a, 22a for engagement with the load-supporting shoulders 15a, 16a of the lugs of the respective studs 10b, 11b. Thus the bridge member-constituted back wall 21, 22 provides a receiving socket portion for the shoulder-providing lug portions of the studs 10b, 11b.

The socket member 20 also has, as indicated in FIG. 1, the inward side wall-provided extensions 23, the said side walls 20a, 20b at, or adjacent, the inner end of said extensions 23 being connected by a third transverse bridge 24. This third side wall-connecting bridge 24 has the rounded abutment 24a which extends in the direction of the outer edge of said socket member 20 and has its outer end tangent with transverse holes 25 extending through the walls 20a, 20b of the member 20 to receive a backing pin 26 for the stud 11b after the stud ends 10b, 11b have been seated in the member 20. It will be noted that the pin 26, when inserted through the holes 25, seats in the rounded seat 19 at the back edge of the stud 11b, and also makes bearing engagement with the lug or shoulder 24a of the aforementioned third transverse bridge 24.

Referring to FIG. 1, it will be apparent that when the assembled link is under longitudinal load the studs 10b, 11b are subjected to eccentric bending forces applied by bridge shoulders 21a, 22a to the related stud shoulders 15a, 16a. These forces tend to bend the studs 10b, 11b inward as indicated by arrows a, b, respectively, in FIG. 1. The eccentric bending originates at the junction line or junction areas of the planar surfaces of the respective stud lug-provided shoulders 15a, 16a with adjacent portions of the respective studs 10b, 11b (see FIG. 1).

A certain amount of the above referred to eccentric bending tendency of the lug of stud 11b is effectively resisted by the backing pin 26; and all of said eccentric bending tendency of the stud 11b lug is prevented by the abutment 24a of socket bridge 24 and said socket carried pin 26 which latter engages in the transverse seat 19 that extends across the rear edge of stud 11b. It is to be noted that pin 26 (see FIG. 1) is preferably located between the plane of shoulder 16a and the nearest limb end portion which is provided by stud 11b. Also for best results said pin 26 will be interposed in the approximate arrow a-indicated path of eccentric stud 11b bending tendency per FIG. 1. In any event the pin 26 is in compression between abutment 24a and stud seat 19. As to stud 10b, eccentric bending load applied to its shoulder 15a is transmitted through stud 11b and pin 26 to the bridge abutment 24a. This is accomplished by reason of the sustaining engagement of the extension or tongue 18 of stud 11b in the opposed limb end recess 17 which is provided by stud 10b so that extension or tongue 18 is approximately in the path of the eccentric bending force to which stud 10b is subjected, as indicated by the arrow a in FIG. 1.

When the link 10, 11 is to be opened about pivot 14 as an axis, the pin 26 is driven out and the socket member 20 shifted to the left, (see FIG. 1) to engage the bridge abutment 24a in the stud-provided pin seat 19 as will be understood from the dotted line showing in FIG. 1, to bring the inner bridge 24 adjacent to the rear of stud 11b. This moves the load-supporting shoulders 21a, 22a of outer bridges 21, 22 outwardly out of alignment with the respective lug shoulders 15a, 16a. Then, if need be, socket member 20 is rocked counter clockwise (FIG. 1) so as to admit of link section 10 being swung clockwise clear of socket member 20. Now, socket member 20 can be freed from link section 11 by rocking it clockwise (FIG. 1) a distance of something like forty-five degrees (see dotted lines, FIG. 1) about 24a, 19 as an axis to clear bridge 22 from the upper end of stud 11b. When assembling the parts the operation is, of course, reversed.

FIG. 1A discloses a slight modification in the FIG. 1 structure in that it shows a thickened bridge 24′ in lieu of the bridge 24 of FIG. 1; and also illustrates tongue 11a as having a lug 11x which substantially abuts 24′ to prevent elongation of the link in service.

FIGS. 6, 7 and 8 show a modified form of the invention comprising U-form link sections 30 and 31, aligned limb portions of which are connected at one side of the link by a pivot pin 32 extending through the ears 30a of section 30 and the interposed tongue terminal 31a of the section 31. Exterior cutouts 33, 34 (FIG. 6) inwardly of the ends of the other limbs of the respective link sections 30, 31 provide side lugs for the studs 30b, and 31b, respectively. The studs 30b and 31b have the transverse load-supporting shoulders 36 and 35, respectively, as shown.

A shackle type socket-providing connector 37 receives the studs 30b, 31b to retain them in end to end relationship as shown in FIGS. 6 and 7. The connector 37 has the laterally spaced side walls 37a, 37b which are connected adjacent opposite ends by bridges 38, 39 that provide the load-supporting shoulders 38a, and 39a, respectively, which engage the adjacent load-supporting lug shoulders of studs 35, 36, as shown.

FIG. 6 also shows the stud 31b as having a projection 40 which seats in the opposed recess 41 of the stud 30b so as to assist in preventing relative transverse shifting of the studs 30b, 31b.

As indicated in FIGS. 6 and 7, the side walls 37a, 37b of the socket member 37 have the spacedly opposed rearward extensions 42 which extend into overlying adjacency to the central link recess and provide the transverse holes 43 which extend through the extensions 42 of walls 37a, 37b of the member 37 to receive the transverse pins 44. Also to be noted is the fact that the rear edge of each of the studs 30b, 31b has the transverse recess 45 in which the adjacent pin 44 seats. The function of these pins 44 is to overcome any tendency of the studs 30b, 31b to bend eccentrically inward under loads transmitted to stud shoulders 35, 36 by the respective bridge shoulders 38a, 39a. The modification shown in FIGS. 6, 7 and 8 makes for a simplified socket member 42 as compared to the socket member 20 in FIGS. 1–5, inclusive, since the third bridge of FIG. 1 is not required, even when the link 30, 31 is under extreme longitudinal loads.

As will be apparent, the stud ends 30b, 31b can be readily freed from socket member 37 by driving out the pins 44 and shifting member 37 to the left as viewed in FIG. 6.

FIG. 10 shows a slight modification of the FIG. 1 structure wherein a slightly different third bridge is shown at 24x which omits abutment 24a; and wherein a smaller sized pin or the equivalent (26x) is employed in lieu of pin 26 of FIG. 1, and is received in the rear surface recess 19 of lug 11b.

Thus in FIG. 10 an insert block 50 which provides the pin-receiving seat 51 is employed to load-supportingly interpose between bridge 24x and pin 26x. The pins 26, 26x and 44 are preferably such as are commercially known as groove pins although the latter are only shown in FIGS. 6 and 10. Groove pins are of case hardened steel and are characterized by a plurality of circumferentially spaced and longitudinally coextensive surface grooves. For frictional holding purposes the grooves of said pin 44 are of progressively diminishing width in the direction of one pin end. The number of grooves is usually the same regardless of the pin size. Thus the smaller sized groove pins hold better and can be reused more times without loss of holding power.

Thus the FIG. 10 arrangement is of particular advantage since it enables a diametrically smaller pin (26x) to be used. Insert 50 may be of any metal or suitable plastic but is preferably of bronze so as to lengthen the life of the pin 26x.

It is to be noted that each of the forms of the invention, except that of FIGS. 6–9, disclose pin-backing means which includes a socket side wall-connecting bridge (see 24, FIG. 1; 24′, FIG. 1A; and 24x, FIG. 10). In such bridge incorporating structures, the stud-backing pins such as 26 (FIGS. 1 and 1A); and the two part stud-backing means 26x, 50 in FIG. 10, must be so cross-sectionally dimensioned as to admit of separation of the related studs from the associated socket members (see 20, FIGS. 1 and 2; and 20x, FIG. 10).

Thus, assuming the links to be closed and the respective rod limb or link limb studs to be socketed as shown, engagement and disengagement of the studs from the related socket members 20, 20x can only be accomplished when a particular related part dimension relationship exists. This related part dimension relationship means that the backing means 26 (FIGS. 1 and 1A; and 26x, 50, FIG. 10) must have a dimension measured on a line normal to the related limb axis which is greater than the thickness of the shoulder-providing lugs of studs 10b, 11b in the direction of said line. The obvious reason for the foregoing requirement is that when there is bridge (24, 24a, FIGS. 1 and 2; or bridge 24x) engagement with the opposed stud, the stud-lug and bridge shoulders 15a, 21 and 16a, 22a, respectively, in FIG. 1, for example, must be more than merely disengaged.

Having thus described my invention, what I claim is:

1. In a coupling for the aligned and engaging terminal ends of a two section link limb or the like, each of said section ends constituted by a single heavy duty stud, one of said studs being designated as the first stud and the other as the second stud, each of said studs having a single longitudinal limb load-sustaining lug projecting laterally in the same direction, each lug having a planar longitudinal load-receiving shoulder of substantial area, said shoulders being spaced inwardly of the related stud-defined section end, interfitting portions provided by the stud-defined meeting ends of said limb sections and cooperating with the end to end engagement of said limb sections to resist movement of said limb section ends in a direction contra to said lateral direction of stud lug projection; the combination of a rigid connector which is open at each end, said connector providing a laterally opening socket receiving and seating said limb terminal-provided studs, longitudinal limb load-supporting shoulders incorporated in said connector socket and engaging the respective stud lug shoulders, a rigid but removable connector-carried backing means for at least said first stud, said backing means having a dimension measured on a line normal to the limb axis which is greater than the thickness of said stud lugs in the direction of said line, whereby to retain the studs and projections in said connector-provided socket, and said backing means located between the plane of the first lug shoulder and the closest end portion of the first lug-provided limb section end so as to prevent eccentric bending of said first stud and its lug in a direction contra to the direction of stud lug projection, laterally spaced and opposed walls provided by said connector and extending beyond the plane of said first stud backing means to support the latter, said connector walls having extensions, and a bridge connecting said wall extensions and engaging and sustaining said stud-backing means when the latter is in operative position, whereby said backing means will be in compression between said bridge and first stud when the two section limb is under longitudinal load.

2. The combination set forth in claim 1, and said stud backing means comprising at least two separable elements, interfitting portions provided by said separable elements and preventing relative movement of the latter in the direction of the length of said two section limb.

3. The combination set forth in claim 1, said stud backing means comprising at least two separable elements, interfitting portions provided by said separable elements and preventing relative movement of the latter in the direction of the length of said two section limb, and the first stud having a surface recess partially receiving the adjacent one of said stud-backing elements.

4. The combination set forth in claim 1, and said bridge being of minor width as compared to the length of said engaged studs and connector in the lengthwise direction of said limb, whereby following removal of said first stud backing means and subsequent trans-limb axis movement of said connector to engage said bridge with said first stud, said connector, with its bridge engaging said first stud, can be rocked longitudinally of said two section limb to admit of disengagement of the lug-carrying studs from said connector-provided socket.

5. The combination set forth in claim 1, and wherein the surface of said first stud which is engaged by said removable connector-carried backing means has a recess partially receiving the latter, said bridge having an inwardly projecting protuberance engaging and supporting said first stud backing means, said bridge protuberance being cross-sectionally dimensioned to be at least partially and pivotally received in said first stud recess upon removal of said backing means followed by trans-limb axis movement of said connector, whereby said connector can be conveniently rocked longitudinally of said two section limb about said bridge protuberance and first stud recess as an axis to admit of disengagement of said lug carrying studs from said connector-provided socket.

6. The combination set forth in claim 1, said bridge being of minor width as compared to the length of said engaged studs and connector in the lengthwise direction of said limb, whereby following removal of said first stud backing means and subsequent trans-limb axis movement of said connector to engage said bridge with said first stud, said connector can be rocked longitudinally of said two section limb to admit of disengagement of the lug-carrying studs from said connector-provided socket, and said stud-carrying limb sections constituting one side of a two part link, said link providing end portions and a second two section limb disposed in spaced opposition to said first mentioned limb, bearing portions providing interengaging terminals of said second mentioned limb, and pivot means connecting the latter for movement of the link parts in a common plane.

7. The combination set forth in claim 1, said bridge being of minor width as compared to the length of said engaged studs and connector in the lengthwise direction of said limb, whereby following removal of said first stud backing means and subsequent trans-limb axis movement of said connector to engage said bridge with said first stud, said connector can be rocked longitudinally of said two section limb to admit of disengagement of the lug-carrying studs from said connector-provided socket, and said stud-carrying limb sections constituting one side of a two part link, said link providing end portions and a second two section limb disposed in spaced opposition to said first mentioned limb, bearing portions providing interengaging terminals of said second mentioned limb, pivot means connecting the latter for movement of the link parts in a common plane, and a projection carried by one of the bearing-providing terminals of one of said last mentioned limb sections, and said projection positioned to engage and sustain said bridge when the link is closed and said connector is in operative position so as to prevent eccentric bending of the link.

References Cited in the file of this patent

UNITED STATES PATENTS

| | | |
|---|---|---|
| 250,195 | Booraem | Nov. 29, 1881 |
| 534,507 | Hoagland | Feb. 19, 1895 |
| 543,183 | Jones | July 23, 1895 |
| 686,829 | McEwen | Nov. 19, 1901 |
| 2,060,548 | Bolling | Nov. 10, 1936 |
| 2,175,504 | Ehmann | Oct. 10, 1939 |
| 2,621,470 | Robbins | Dec. 16, 1952 |
| 2,877,621 | Robbins | Mar. 17, 1959 |

FOREIGN PATENTS

| | | |
|---|---|---|
| 281,771 | Germany | Feb. 1, 1915 |